United States Patent [19]
Mamahit

[11] 4,206,246
[45] Jun. 3, 1980

[54] PROCESS FOR FLAVORING PEANUTS

[76] Inventor: Jopie J. Mamahit, Bloque 6 - Andalucia Sq., Torremolinos (Malaga), Spain

[21] Appl. No.: 900,305

[22] Filed: Apr. 26, 1978

[30] Foreign Application Priority Data

Apr. 28, 1977 [ES] Spain ................................ 458.274

[51] Int. Cl.$^2$ ............................................. A23L 1/36
[52] U.S. Cl. .................................. 426/632; 426/640; 426/507
[58] Field of Search ................ 426/93, 632, 438, 441, 426/507, 509, 640

[56] References Cited

U.S. PATENT DOCUMENTS

| | | | |
|---|---|---|---|
| 692,327 | 2/1902 | Moyer | 426/632 |
| 713,918 | 11/1902 | Potter | 426/632 |
| 1,397,187 | 11/1921 | Tucker | 426/632 |
| 1,637,068 | 7/1927 | Willison | 426/632 |
| 2,643,190 | 6/1953 | Hageman | 426/632 |
| 2,969,290 | 1/1961 | Block | 426/632 |
| 4,049,833 | 9/1977 | Gannis et al. | 426/632 |
| 4,085,230 | 4/1978 | Green | 426/632 |

Primary Examiner—Jeanette M. Hunter
Attorney, Agent, or Firm—Dennison, Dennison, Meserole & Pollack

[57] ABSTRACT

Flavoring peanuts by impregnating the peanut meat with a selected flavoring material mixed with water just below boiling and in which the peanut is permitted to soak from 100 to 150 seconds to absorb approximately 10% of the mixture of flavoring material and water and subsequently cooking the flavored nuts.

6 Claims, No Drawings

PROCESS FOR FLAVORING PEANUTS

This invention relates to a method for salifying peanuts and more particularly, to a salifying process which avoids the application of an external coating of salt or other flavoring to the outer surfaces of the nut.

Peanuts processed under the usual technique are shelled and cleaned in the traditional manner and are then cooked by roasting, frying, or other generally well recognized cooking method.

The peanut thus prepared retains a residual amount of oil on its surface and it is that residual oil which provides a binder for salt and other flavoring materials normally applied to the nut after the cooking process. Thus, a coating of salt and other flavoring materials adheres to the outer surface of the nut, after which the nuts are packaged for distribution and sale.

The disadvantage of this technique resides in the imperfect adherence of the salt and other flavorings to the external surfaces of the nut and thus, such nuts are adversely affected by variations in both temperature and humidity, in addition to which, significant portions of the coating materials are separated from the nut surface during packaging handling and subsequent consumption by the consumer. Thus, quantities of salt and other flavoring materials are transferred to the fingers of the ultimate consumer leaving residual salt, and the like, on the fingers of the consumer long after the consumption of the product.

It is an object of this invention to flavor peanuts and other nut fruits with salt and/or selected flavorings without leaving a residual coating on the surface of the nut.

It is another object of the present invention to flavor peanuts and other nut fruits by impregnating the flavoring material into the body of the nut before the nut has been cooked by the usual roasting, frying, and/or boiling technique.

It is still a further object of this invention to produce a flavored peanut product which may be consumed without contamination of the fingers of the consumer and without the attendant separation of the flavoring materials from the nut fruit normally encountered with coated products.

In practicing the method contemplated by this invention, nuts which have been shelled, peeled and otherwise separated from their hulls are salted by immersing the prepared nuts in a mixture of potable water and common salt mixed generally in a proportion of 80% water and 20% salt. The salt water mixture is heated to the boiling point, after which the heat is removed and the mixture is allowed to stand until the boiling stops. Upon cessation of the boiling, the peanuts are poured into the mix in a proportion of approximately 50% peanuts and 50% mix wherein the peanuts are allowed to soak for a time period of between 100 and 150 seconds. After the soaking period, the fruit is removed from the brine by draining for a period of approximately fifteen minutes.

Experimentation has established that during the soaking stage, the peanuts absorb approximately 10% of the volume of the brine solution, thus imparting to the peanut a sufficient quantity of salt to satisfy general tastes.

Following the immersion, soaking and draining steps, the peanuts may be cooked in the usual manner as, for example, by being immersed in hot cooking oil and retained therein for a sufficient period of time to complete the cooking process.

As an alternative procedure, other flavors may be imparted to the peanut by soaking the nut fruits in a liquor comprised of potable water and the particular flavor desired. As an example, the peanuts may be sweetened by immersing them in a mixture of potable water and 25% sugar following the steps suggested above for the application of the salt.

As a third alternative, a garlic taste may be imparted to the product and in this procedure, ground natural garlic may be added to the salt water brine in a proportion of 10% to 14% depending upon the degree of garlic flavor desired. When the garlic flavoring is employed, I have found that introducing the garlic flavor to the brine and allowing the mixture to boil for approximately ten minutes provides a particularly strong salt and garlic flavored mixture and imparts a stronger flavor to the nut meats.

In each instance, the flavored brine may be brought to a boil for a brief period with the nuts therein to enhance the penetration of the flavoring material into the structural body of the nut meat.

This invention also contemplates imparting a soy sauce flavor to the nut meat by mixing in the brine a quantity of soy sauce. In this example, it is recognized that soy sauce contains a significant quantity of salt and thus, proportions of 8% salt and 12% soy sauce are combined with each other to provide 20% of the proportion, the rest constituting potable water.

In each of the foregoing techniques, the nut meat is flavored by penetration of the flavoring through the surface of the nut meat and into the structural body thereof without leaving an attendant coating on the external surfaces. The intensity of the flavor may, of course, be varied by increasing and decreasing the soaking times and the cooking periods after application of the flavoring material has been completed.

Obviously, this invention is not limited to the specific proportions of flavoring materials and cooking steps except as defined in the claims attached hereto.

I claim:

1. The process of flavoring and cooking shelled, peeled, uncooked peanuts comprising the sequential steps of: preparing an aqueous solution of a flavoring material; heating said solution to the boiling point, removing said heating; allowing the solution to stand until the boiling stops; upon cessation of the boiling mixing quantities of said shelled, peeled, uncooked peanuts and said heated solution and soaking said uncooked peanuts therein for a period of approximately 100 to 150 seconds to impregnate said peanuts with said solution; separating impregnated peanuts from unadsorbed solution by draining for a period of approximately 15 minutes and thereafter cooking said impregnated peanuts wherein flavored peanuts free of residual external coating of flavoring are produced whereby the flavored peanuts may be consumed without contamination with flavoring of the fingers of a consumer.

2. The process of claim 1 wherein said solution comprises water and salt in a ratio of approximately 20% salt and 80% water.

3. The process of claim 1 wherein said solution comprises water and sugar in ratio of approximately 25% sugar and 75% water.

4. The process of claim 1 wherein said solution is derived from a mixture of 20% salt, 10 to 14% natural ground garlic and the remainder water.

5. The process of claim 4 wherein said mixture is boiled for a period of approximately 10 minutes prior to introduction of said nuts.

6. The process of claim 1 wherein said solution comprises approximately 8% common salt, 12% soy sauce and the remainder water.

* * * * *